(No Model.)
G. B. SCHMIDT.
FEED BAG ATTACHMENT.
No. 457,220. Patented Aug. 4, 1891.
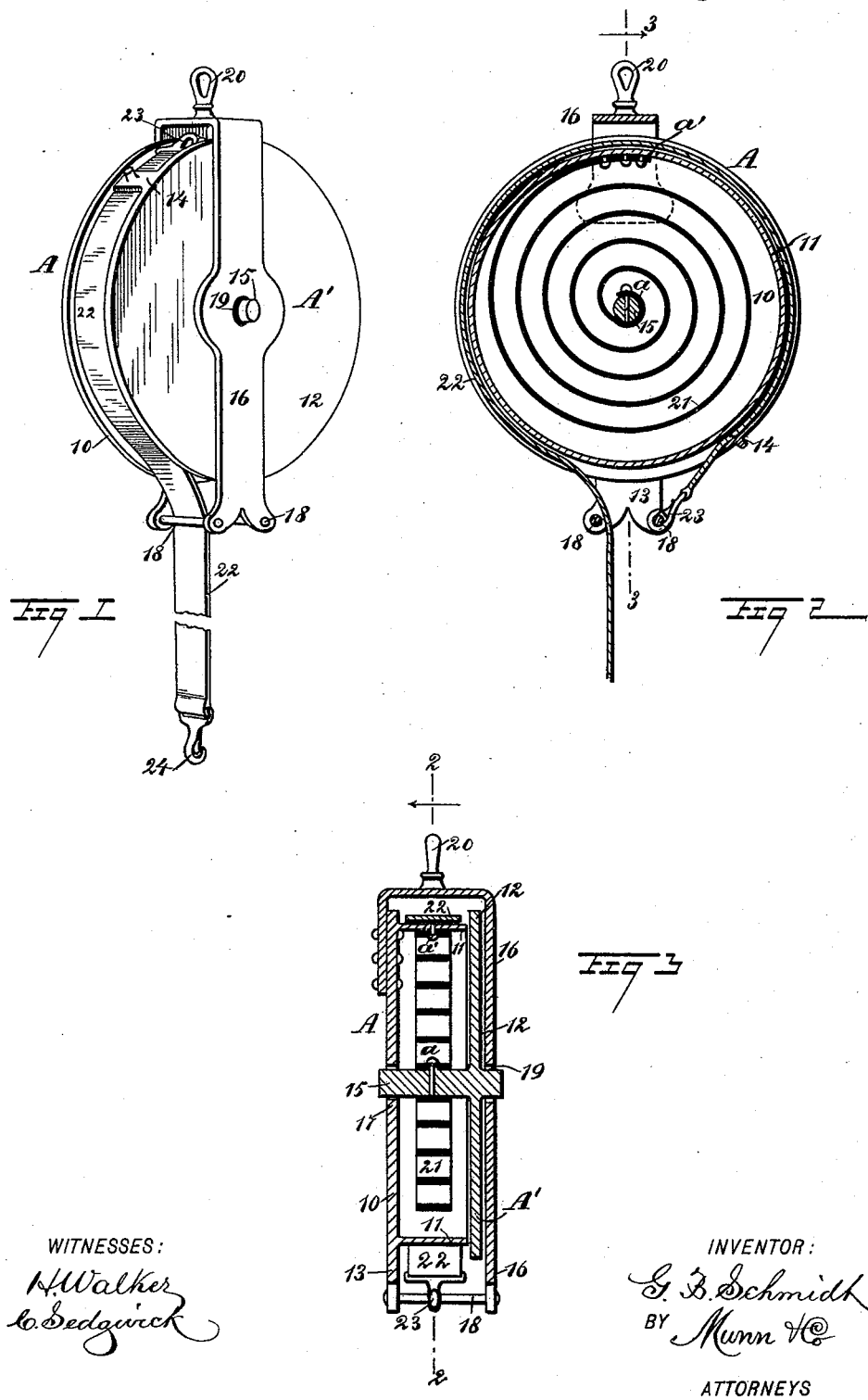
WITNESSES:
H. Walker
C. Sedgwick
INVENTOR:
G. B. Schmidt
BY Munn & Co.
ATTORNEYS

UNITED STATES PATENT OFFICE.

GEORGE B. SCHMIDT, OF NEW YORK, N. Y.

FEED-BAG ATTACHMENT.

SPECIFICATION forming part of Letters Patent No. 457,220, dated August 4, 1891.

Application filed February 27, 1891. Serial No. 383,120. (No model.)

*To all whom it may concern:*

Be it known that I, GEORGE B. SCHMIDT, of New York city, in the county and State of New York, have invented a new and useful Improvement in Feed-Bag Attachments, of which the following is a full, clear, and exact description.

My invention relates to an attachment to feed-bags, and has for its object to provide a tension device capable of attachment to any feed-bag and so constructed that the bag from which an animal is feeding will be elevated proportionately to the amount of feed taken therefrom. Thus the food will be readily accessible to the animal at all times during feeding.

The invention consists in the novel construction and combination of the several parts, as will be hereinafter fully set forth, and pointed out in the claim.

Reference is to be had to the accompanying drawings, forming a part of this specification, in which similar figures and letters of reference indicate corresponding parts in all the views.

Figure 1 is a perspective view of the device. Fig. 2 is a vertical section taken on the line 2 2 of Fig. 3, and Fig. 3 is a vertical section taken at a right angle to the section shown in Fig. 2, and upon the line 3 3 of said figure.

The body of the device is preferably of circular form, and is made in two sections A and A'. The section A consists of a disk 10, provided with an annular flange 11, extending at a right angle therefrom and preferably integral therewith, the flange being located some little distance from the periphery of the disk, as illustrated in Fig. 3. The section A' comprises a disk 12 only, of a size corresponding to that of the disk of the opposed section. The disk of the section A at its lower end is provided with a downwardly-extending lug or ear 13, the said lug or ear being preferably made integral with the disk, and its outer face is also preferably in a plane with the corresponding face of the disk.

The disk 12 of the section A' of the body is provided near its top with an arm 14, extending from the edge at a right angle to the inner face of the disk, and the arm 14 is of a length corresponding to the width of the flange 11, as best illustrated in Fig. 1. The disk 12 is provided with a fixed post or pintle 15, extending at a right angle from the central portion of its inner face, and also preferably beyond its outer face, as shown in Fig. 3, and in the disk 10 of the body-section A an aperture 17 is made to receive the post or pintle 15 when the two body-sections are brought together.

When the two sections of the body are united, the disk 12 engages with the flange 11, and the union of the sections is preferably effected through the medium of a yoke 16, which is attached to the outer face of the disk 10, and is carried over both disks and thence downward in engagement with and below the lower edge of the disk 12, opposite the lug 13, and the lug and the lower extremities of the yoke are connected by two spaced bars 18 or their equivalents. The downwardly-extending or longer member of the yoke is provided with an aperture 19, through which the outer end of the pivot post or pin passes. The pivot post or pin fits loosely in its bearings. Therefore it and the attached disk 12 are capable of revolving, the body-section A being adapted to remain stationary. The yoke is provided upon its upper surface with an eye 20 or the equivalent thereof. A spring 21 is coiled around the post within the body, one end of which spring is rigidly secured to the post, as shown at *a*, while the opposite end is fast to the inner face of the flange 11, as shown at *a'*.

A strap 22 is secured to the arm 14 of the body-section A', the attachment being preferably upon the under side. The strap extends a short distance beyond one side edge of the arm, and this shorter section is provided with an attached hook or clip 23. The remaining portion of the strap is carried downward in the channel formed by the extending edges of the two disks and down between the rods 18 of the yoke, and this lower end of the strap is also provided with a clip 24 or its equivalent.

When tension is exerted upon the strap 22, the spring 21 within the body is coiled or brought under tension, and the tendency of the said spring is at all times to uncoil, and when in this position the shorter end of the strap 22 will be near one of the rods 18, with which rod the hook or clip 23 may be connected, as shown in Fig. 2, and this connection is effected when it is desired to place away a feed-bag having the devices attached, as when the strap is connected with one of the rods 18 the tension is removed from the spring, no matter what weight is attached to the lower end of the strap.

In practice one of the devices is used to connect with each side of a feed-bag, and the two devices are united by a rope, strap, or its equivalent, attached to the eyes 20, which rope or strap is used to sustain the bag from the animal's neck.

I desire it to be understood that the device may be made of any approved material and that the manner in which the yoke is secured to the body-section may be varied without materially altering the character of the invention, or an equivalent of the yoke may be substituted.

When a feed-bag is provided with the tension devices and suspended from an animal's neck, as the food is consumed by the animal the spring expands proportionately, thereby reeling up the strap 22 and shortening the distance between the devices and the bag, thus constantly maintaining the feed within convenient reach of the animal's mouth. The use of the device prevents waste of feed, as there is no necessity for the animal to toss or throw up his head in order to reach the feed in the bag, which is, in the ordinary bag, out of reach when the head is in proper position for eating. The device is also a time-saving one, as it obviates the necessity of the services of an attendant to shorten the rope suspending the bag to bring the feed within the animal's reach. This service is performed automatically by the device herein described.

Having thus described my invention, I claim as new and desire to secure by Letters Patent—

A tension device for feed-bags, consisting of a body constructed in two sections, one of which is fixed and the other movable, a spring attached to and coiled around the pivot of the movable section and also secured to the fixed section, a strap connected with the movable section and provided with clamps at its ends, and a suspension device attached to the body provided with a keeper and a guide, one for engagement with the strap and the other for engagement with one of its clamps, as and for the purpose set forth.

GEORGE B. SCHMIDT.

Witnesses:
G. A. F. SEELIG,
JOHN J. RUPP.